United States Patent [19]

Durand et al.

[11] Patent Number: 4,532,146

[45] Date of Patent: Jul. 30, 1985

[54] MILKY PRODUCTS FOR MANUFACTURING CHOCOLATE-TRADE PRODUCTS AND METHOD OR PREPARATION THEREOF

[75] Inventors: Daniel Durand; Yves Grandadam, both of Vendôme, France

[73] Assignee: Fromageries Bel, France

[21] Appl. No.: 607,712

[22] Filed: May 7, 1984

Related U.S. Application Data

[63] Continuation of Ser. No. 413,558, Aug. 31, 1982, abandoned, which is a continuation of Ser. No. 185,496, Sep. 9, 1980, abandoned.

[30] Foreign Application Priority Data

Sep. 19, 1979 [FR] France ............................... 79 23356

[51] Int. Cl.$^3$ ............................ A23C 9/00; A23G 3/00
[52] U.S. Cl. .................................... 426/580; 426/448; 426/660
[58] Field of Search ............... 426/580, 660, 448, 471, 426/516, 523, 585; 99/353; 100/93 S, 41, 38

[56] References Cited

U.S. PATENT DOCUMENTS 3,965,268  6/1976  Stocker et al. ...................... 426/448

FOREIGN PATENT DOCUMENTS 2256728  1/1975  France .

Primary Examiner—George Yeung
Attorney, Agent, or Firm—Lowe, King, Price & Becker

[57] ABSTRACT

In a method for preparing products replacing milk, in a baking-extruding device, at least a raw material selected from the group composed of partially or wholly skimmed milk, lactoserum, serum proteins, caseins-caseinates, buttermilk and lactose is introduced, possibly with fatty material, one or more additives (selected from emulsifiers, bases and salts) and water, and a pressure of about 20 to 100 bars, at a temperature of about 40° to 150° C., is applied for a time of about 30 seconds to 2 minutes; the thus obtained products are used for replacing milk, avoiding the drawbacks of the milk powders obtained by the conventional drying methods, these products being employed in chocolate-trade.

6 Claims, No Drawings

MILKY PRODUCTS FOR MANUFACTURING CHOCOLATE-TRADE PRODUCTS AND METHOD OR PREPARATION THEREOF

This application is a continuation of application Ser. No. 413,558, filed Aug. 31, 1982, now abandoned, which is a continuation of application Ser. No. 185,496, filed Sept. 9, 1980, abandoned.

BACKGROUND OF THE INVENTION

1. Field of the Invention

The present invention concerns generally food products and relates, more particularly, to a method for preparing products suitable for partially or completely replacing used for manufacturing chocolate-trade products, particularly based on cocoa and chocolate or including products replacing cocoa and pastes to be frozen. It also relates to the new thus obtained products.

2. Description of the Prior Art

In the present techniques for manufacturing chocolate-trade products comprising chocolate, cocoa or products replacing cocoa, powdery, partially or fully skimmed milk is used. In order to obtain this milk powder, generally a cylinder drying process is used, employing a drying device with two close cylinders, rotating in reverse direction and internally heated by steam. Milk falls between both cylinders and is uniformly spread on their surface. Consequently, the drying is fast with milk forming a film which is removed by a doctor knife.

This cylinder drying method presents however many drawbacks. It is costly from the energy viewpoint, and, consequently, small size plants are used moreover, the quality of the products is not always uniform and, sometimes, overheating at points producing bad tastes which remain in the products.

There are other drying processes, particularly the so-called Spray process which is less costly and uses a technique easier to control than the cylinder drying process. The Spray process has been employed for manufacturing full milk or skim milk powder, which can be incorporated within chocolate-trade products. However, this process results in problems because the powder does not perform well in the chocolate-trade due to its particle size and the shape of its particles, and because of the small denaturation of proteins. Moreover, when full milk is employed, the thus obtained product results in problems, particularly because of its free fatty material rate.

It would be therefore useful to provide a method for preparing products which will replace dry milk produced by the cylinder drying method, used in the manufacture of products on basis of cocoa and chocolate, or with products replacing cocoa; and pastes to be frozen, this process overcoming the drawbacks of the cylinder drying process.

SUMMARY OF THE INVENTION

An object of the present invention is to provide a method for preparing suitable for replacing powdery milk dried by the cylinder drying process.

Another object of the present invention is to provide a product replacing milk dried by the cylinder drying process, this product being used in the manufacture of products based on cocoa and chocolate, or with products which can replace cocoa and pastes to be frozen.

Other objects will appear from the following specification.

DETAILED DESCRIPTION OF THE INVENTION

These objects are now met, according to the present invention, by a method for preparing a product suitable for partially or fully replacing milk used in the manufacture of chocolate-trade products, particularly products based on cocoa or chocolate or including products replacing cocoa and pastes to be frozen. In this method there is provided a baking-extrusion device, and at least a raw material selected from the group consisting of lactoserum, serum proteins, caseins-caseinates, buttermilk and lactose, is introduced, possibly with fatty material, sugar and cocoa paste, one or more additives and water, and a pressure of between about 20 and 100 bars, at a temperature of about 40° to 150° C., is applied for a time of about 30 seconds to 2 minutes.

The raw material is composed of lactoserum, serum proteins obtained by any method (thermal treatment or membrane separation such as through ultrafiltration), caseins-caseinates, buttermilk and lactose. A mixture of two or more of these materials can be also used. The raw material is generally as a very concentrated liquid or as a powder.

In this raw material, fatty materials of animal origin (for example cream, butter, anhydrous milky fatty material, so-called butteroil product) or fatty materials of vegetable origin can be added, in an amount of about 0 to 40% with respect to the weight of the raw material. Particularly, cocoa fatty material as cocoa butter or cocoa paste can be added.

Additives selected from the group composed of emulsifiers (particularly lecithin or sugar glycerides), bases such as sodium hydroxide, potassium hydroxide, ammonium hydroxide, etc . . . or salts such as sodium and calcium phosphates, calcium, sodium, potassium, etc . . . chlorides can also be added to the raw material, these additives causing changes in the structure of proteins and impart to the product to be obtained desired technological properties, such as interesting rheologic characteristics (more or less fluidity, viscosity, flow limit).

The raw material, and, possibly, fatty materials, sugar, cocoa paste and additives are introduced as a powder or as a paste into a backing-extruding device. If it is desired to form a paste, water is added to the powder in an amount which is determined as a function of the dry extract that it is desired to obtain; this amount being generally about 0 to 20%, preferably about 8 to 12%, with respect to the weights of the raw material which may be added with the fatty materials and additives.

The baking-extruding device is preferably a two-screw baking-extruding reactor device, wherein a temperature and pressure selected as a function of the product which it is desired to obtain intervene. A two-screw baking-extruding device having the type of the device developed by Société Creusot-Loire is preferred but any other type of two-screw or one-screw baking-extruding device can be used.

A reaction temperature which does not result in any modification of the raw material fatty materials, sugar, or cocoa paste and of additives is selected. This temperature, according to the desired final product, promotes or does not promote, a Maillard reaction generating a particular aroma. This temperature is within the range of about 40° to 150° C., preferably 70° to 90° C.

The pressure is determined by the amount of water added into the raw material, the fatty materials and the additives; at the beginning of the reaction, it is generally between about 20 and 100 bars, preferably between 40 and 60 bars.

The above mentioned temperature and pressure are applied for a time of between about 30 seconds and 2 minutes. The treatment conditions are also a function of the fatty material content of the whole of the products to be treated. Thus, if the product contains fatty material, relatively low temperatures and pressures should be used, or else the fatty material is separated from the product, with a risk of degradation of this material.

In the baking-extruding device, the screw profile is set in such a way that the mechanical work is sufficient without resulting in an overheating of the raw material during the baking-extrusion. Consequently, dies having a surface of 30 to 300 mm² and screws with screw-plate shape of 1.5 to 3.5 mm, in the case of a baking-extruding device of the BC 72 Creusot-Loire type, are used.

When exiting from the baking extruding device, the product is in the semi-pasty or semi-dry state, according to the amount of added water and the used die. The product is cooled in order to harden. It is preferable that the product is thin and is slightly crumbly laminations. The surface area/volume ratio for the product should be the highest possible in order to increase drying and speed up cooling.

In order to give to the product a particle size corresponding to a granulation compatible with the use in chocolate-trade, this product is crushed by using a hammer crusher or a crusher giving fine crushing. In the case of using a hammer crusher, particles the size of which (about 100μ) is similar to those of milk powder particles obtained by the conventional method are produced. In the case of crushers giving fine crushing, having the type of crushers that can be obtained from Société Ultrafine or in the case of crushers-dryers that can be obtained from Société Procalex, a particle size which is comprised between 15 and 30μ is obtained. This last type of crusher provides the product with additional drying.

After crushing, the thus obtained product can be employed in the chocolate-trade, in order to manufacture particularly products based on cocoa and chocolate or including products replacing cocoa, and pastes to be frozen, in order to replace milk dried by the cylinder drying method.

The thus obtained product has properties similar to those of the conventional product and presents many advantages: that is, the products have constant or uniform quality, do not present any overheating points and the taste and the viscosity of the product may be varied as a function of the user's needs due to the use of any of the cited raw materials or mixtures thereof. Moreover, the present invention allows one to use as raw materials less costly products than the conventional products and to valorize cheesedairy and casein factory by-products. Another advantage of this technique lies in the fact that it allows one to obtain a better preservation of the products.

The present invention will now be disclosed with the aid of the following examples, which are only given illustratively and are not limiting.

EXAMPLE 1

The following mixture of powders is used:
Lactoserum freed from lactose through ultrafiltration, with 19% proteins: 90.5%
Sodium caseinate: 9.5%

This mixture is introduced into a baking-extruding device having the following features:
Creusot-Loire extruder:
Screw-plate shape: 2.5 mm
Flat die: width: 25 mm
thickness: 2 mm
Screw rotation velocity: 50-70 rpm An induction heating system is employed in order to obtain a temperature, inside the sheath, of 75°-85° C.

Just after introducing the powder, the amount of water necessary for obtaining the desired dry extract from the product is injected through a dosing pump.

Extruding conditions

Power flow rate at the inlet: 70 kg/hr
Added water: 8 kg/hr
Temperature: 75°-85° C.
Outlet pressure of the product: 35 bars The thus obtained product is then cooled so that it hardens and it is afterwards crushed in a hammer crusher in order that its average particle size is about 100μ. This power can be thereafter used in a conventional way so as to replace the milk powder in the manufacture of products based on cocoa and chocolate or including products which replace cocoa, and pastes to be frozen.

EXAMPLE 2

The following mixture is used:
Powdery skim milk: 55.5%
Lactoserum: 18.5%
Anhydrous milky fatty material: 26%

The extruder features are identical with those of example 1, but the operating conditions are as follows:
Powder feed: 50 kg/hr
Water feed: 5 kg/hr
Temperature: 55°-65° C.
Pressure: 20 bars The thus obtained product is then cooled and crushed under conditions identical with those of example 1.

The thus obtained powder is usable in the manufacture of products based on cocoa and chocolate or with products which replace cocoa, and pastes to be frozen, so as to replace the fat milk obtained by the cylinder drying method. The rheologic features of chocolate (viscosity and flow limits) are improved by 10 to 15% according to the rate of incorporation of the powder and the organoleptic features are completely equivalent to those of conventional product, being even improved as concerns the fondant.

What is claimed:

1. A method for the preparation of products consisting essentially of cocoa- and chocolate-milk and milk powder for use in replacing dried milk in the manufacture of chocolate trade products, the process consisting essentially of the following sequential steps:
   (a) obtaining a raw material selected from the group consisting of lactoserum, serum proteins, caseins, caseinates, buttermilk and lactose;
   (b) introducing said raw material as a powder or as a paste into a baking-extruding device with 0-20% weight of water;
   (c) subjecting said raw material to working within said baking-extruding device by the application of a temperature within the device of 40°-90° C. and a pressure in the range of about 20-100 bars for a time ranging from 30 seconds to 2 minutes; and (d) recovering the semi-pastey or semi-dry resulting product.

2. A method according to claim 1, wherein said raw material is passed through said baking-extruding device at a temperature of 70°-90° C. and a pressure of between 40-60 bars.

3. A method according to claim 1, wherein the resulting product is removed from the baking-extruding device, cooled, and crushed to form fine particles.

4. A method according to claim 1, wherein about 8-12 weight percent of water is present based on the weight of the raw material and the resulting product is a paste.

5. A method according to claim 1, wherein a member selected from the group consisting of fatty materials, emulsifiers, bases, and salts, and mixtures thereof is added with the said raw material to the baking-extruding device.

6. A method for the preparation of products consisting essentially of cocoa- and chocolate-milk and milk powder for use in replacing dried milk in the manufacture of chocolate trade products, the process consisting essentially of the following sequential steps:

(a) obtaining a raw material selected from the group consisting of lactoserum, serum proteins, caseins, caseinates, buttermilk and lactose;

(b) introducing said raw material as a powder or as a paste into a baking-extruding device with 0-20% weight of water;

(c) subjecting said raw material to working within said baking-extruding device by the application of a temperature within the device of 40°-90° C. and a pressure in the range of about 20-100 bars for a time ranging from 30 seconds to 2 minutes;

(d) recovering the semi-pastey or semi-dry resulting product; and (e) using the resulting product in the manufacture of chocolate-trade products.

* * * * *